(No Model.)

A. W. SCHLEICHER.
MEANS FOR CONNECTING ENGINES AND DYNAMOS.

No. 367,241. Patented July 26, 1887.

WITNESSES:
Chas. C. Collier,
David L. Collier.

INVENTOR
Adolphus W. Schleicher
BY
Chas. B. Collier
ATTORNEY

UNITED STATES PATENT OFFICE.

ADOLPHUS W. SCHLEICHER, OF PHILADELPHIA, PENNSYLVANIA, ASSIGNOR TO SCHLEICHER, SCHUMM & CO., OF SAME PLACE.

MEANS FOR CONNECTING ENGINES AND DYNAMOS.

SPECIFICATION forming part of Letters Patent No. 367,241, dated July 26, 1887.

Application filed May 6, 1887. Serial No. 237,384. (No model.)

*To all whom it may concern:*

Be it known that I, ADOLPHUS W. SCHLEICHER, of the city and county of Philadelphia, in the State of Pennsylvania, have invented certain new and useful Improvements in Means for Connecting an Engine with a Dynamo-Electric Machine, of which improvements the following is a specification.

My invention consists of a pivotal or hinged connection for one end of the supporting-frame of a dynamo-electric machine combined with a gas or other engine, and which support may be on a part of the engine, or independent of the same, and with a driving-pulley on the end of the shaft of the dynamo-machine supported by the rim of the driving pulley or wheel of the engine in such a manner that part of the weight of the dynamo-electric machine will alone be supported by the driving wheel or pulley of the engine, whereby sufficient friction will be secured between the respective wheels or pulleys to cause the power of the engine to be communicated most conveniently and with the least loss to the dynamo-electric machine. Variations in the speed of the engine can be compensated for, and greater uniformity of motion of the dynamo-electric machine secured, by employing a fly-wheel on the shaft thereof, while at the same time the friction between the fly-wheel of the engine and the driving-pulley of the dynamo is correspondingly increased.

The nature of my invention will be more fully understood by reference to the accompanying drawings, wherein—

Figure 1:
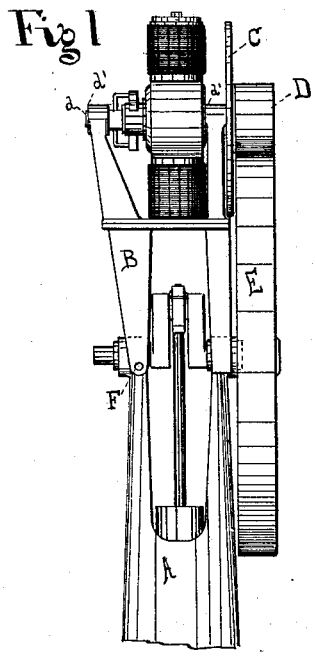
Figure 2:
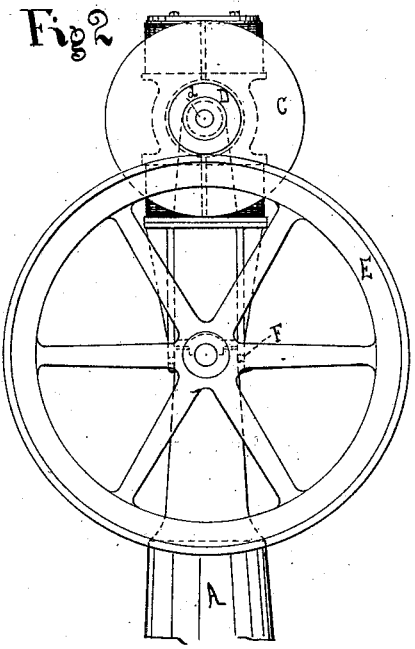
Figure 3:
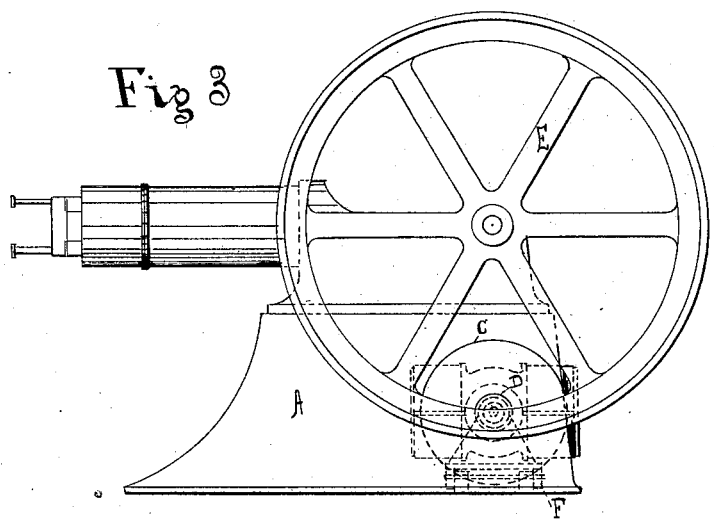

Figure 1 is a front elevation of a vertical engine combined with a dynamo-electric machine embodying the essential features of my invention. Fig. 2 is a side view thereof. Fig. 3 is a side elevation of a horizontal engine combined with a dynamo-electric machine, with my invention shown in application; and Fig. 4 is a front view of the same.

Referring to the drawings for a further description of my invention, A is the frame of the engine; B, the frame of the dynamo-electric machine; C, the fly-wheel of the dynamo-electric machine; D, the driving-pulley thereof secured to the commutator-shaft $d$, held in a bearing in the standard $d'$.

E is the driving-wheel of the engine, and F the hinge or pivotal connection between the frame of the dynamo-electric machine and the engine. The weight of the fly-wheel C is carried or supported by the driving-wheel E of the engine, and thus will neither bend the shaft of the dynamo nor heat the bearings thereof.

Figure 4:
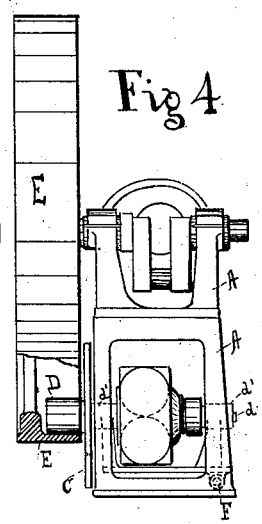

In Figs. 1 and 2 it will be seen that the pulley D of the dynamo-machine is supported upon the outer surface or periphery of the driving-wheel E of the engine, while in Figs. 3 and 4 it is supported upon the inner surface of the rim of the driving-wheel E, but the principle and operation are the same in both cases.

I am aware that dynamo-electric machines have heretofore been operated by frictional contact of their pulleys with the driving-wheels of engines; but in such cases the requisite pressure and friction at the point of contact of the respective wheels or pulleys have been secured by springs, weights, levers, or equivalent devices applied to the shafts of the dynamo-electric machines, and were attended with serious disadvantages, since their tendency was to bend the shaft of the dynamo, thereby heating its bearings.

Having thus described the nature and objects of my invention, what I claim as new, and desire to secure by Letters Patent, is—

A dynamo having a hinged connection with an engine, whereby frictional contact is secured between the driving and driven pulleys thereof, substantially as described.

In witness whereof I have hereunto set my hand in the presence of two subscribing witnesses.

ADOLPHUS W. SCHLEICHER.

Witnesses:
CHAS. C. COLLIER,
GEO. W. REED.